United States Patent
Bae et al.

(10) Patent No.: US 9,552,120 B2
(45) Date of Patent: Jan. 24, 2017

(54) TOUCH SCREEN PANEL AND METHOD FOR FABRICATING THE SAME

(71) Applicant: SAMSUNG DISPLAY CO., LTD., Yongin, Gyeonggi-Do (KR)

(72) Inventors: Joo-Han Bae, Seongnam-si (KR); Jinhwan Kim, Seoul (KR); Yunha Kim, Cheonan-si (KR); Sejeong Won, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 6 days.

(21) Appl. No.: 14/662,856

(22) Filed: Mar. 19, 2015

(65) Prior Publication Data
US 2016/0041644 A1 Feb. 11, 2016

(30) Foreign Application Priority Data
Aug. 6, 2014 (KR) .......................... 10-2014-0101038

(51) Int. Cl.
*G06F 3/044* (2006.01)
(52) U.S. Cl.
CPC ..... *G06F 3/044* (2013.01); *G06F 2203/04103* (2013.01); *G06F 2203/04111* (2013.01); *G06F 2203/04112* (2013.01)
(58) Field of Classification Search
CPC ............ G06F 3/044; G06F 2203/04103; G06F 2203/04111; G06F 2203/04112
See application file for complete search history.

(56) References Cited

U.S. PATENT DOCUMENTS

| 9,164,639 | B2 * | 10/2015 | Chen ........................ G06F 3/044 |
| 2013/0032414 | A1 * | 2/2013 | Yilmaz .................... G06F 1/169 |
| | | | 178/18.06 |
| 2013/0181921 | A1 * | 7/2013 | Kuwajima .............. G06F 3/041 |
| | | | 345/173 |
| 2013/0278513 | A1 * | 10/2013 | Jang ........................ G06F 3/044 |
| | | | 345/173 |
| 2014/0168529 | A1 * | 6/2014 | Lin ...................... G02F 1/13338 |
| | | | 349/12 |

FOREIGN PATENT DOCUMENTS

| KR | 10-1101088 | 12/2011 |
| KR | 10-1322946 | 10/2013 |
| KR | 10-2014-0000479 | 1/2014 |
| KR | 10-1397682 | 5/2014 |
| KR | 10-1405736 | 6/2014 |
| KR | 10-1428009 | 8/2014 |
| KR | 10-2014-0110270 | 9/2014 |

* cited by examiner

*Primary Examiner* — Abbas Abdulselam
(74) *Attorney, Agent, or Firm* — Lee & Morse, P.C.

(57) ABSTRACT

A touch screen panel includes a sensing electrode area, a pad area, and a peripheral wiring area. The sensing electrode area includes first sensing electrodes and second sensing electrodes on a touch substrate and spaced from each other. The peripheral wiring area connects the sensing electrode area to the pad area. Each of the first sensing electrodes includes a first sensing metal layer on the touch substrate, a sensing insulation layer on the first sensing metal layer, and a second sensing metal layer on the sensing insulation layer and having a mesh structure. The second sensing metal layer is thicker than the first sensing metal layer.

20 Claims, 12 Drawing Sheets

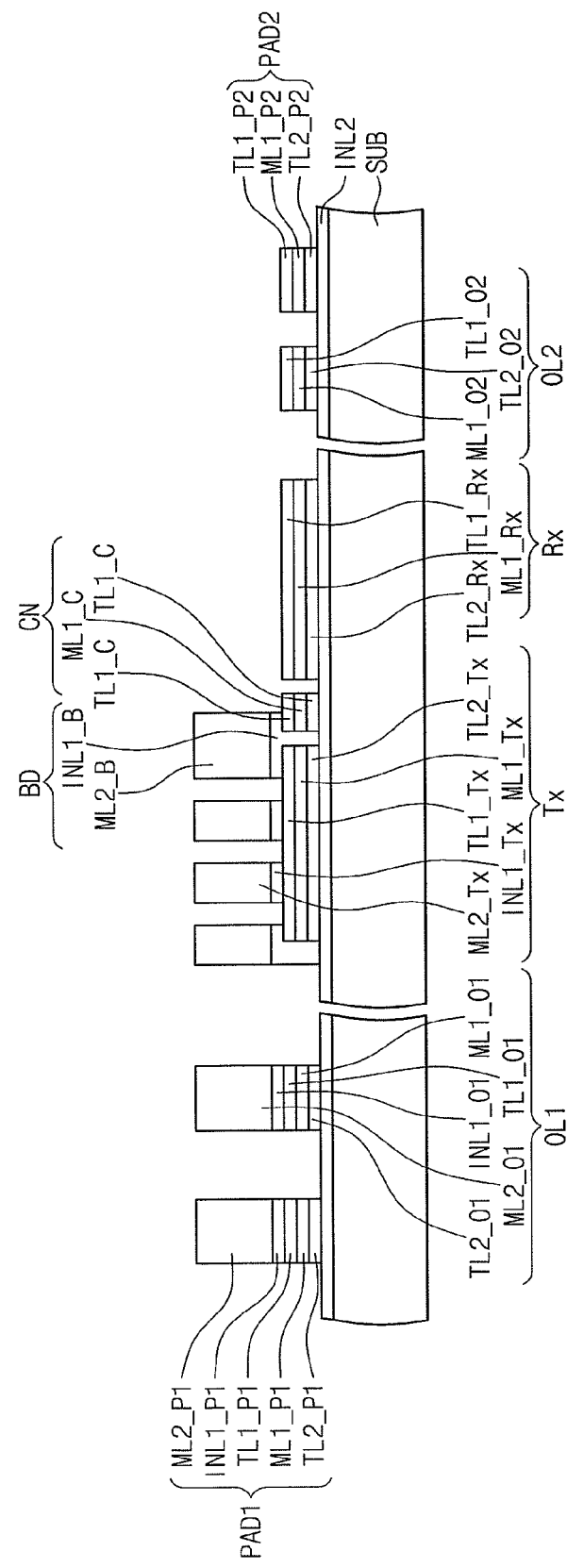

TOUCH SCREEN PANEL AND METHOD FOR FABRICATING THE SAME

CROSS-REFERENCE TO RELATED APPLICATION

Korean Patent Application No. 10-2014-0101038, filed on Aug. 6, 2014, and entitled, "Touch Screen Panel and Method for Fabricating The Same," is incorporated by reference herein in its entirety.

BACKGROUND

1. Field

One or more embodiments described herein relate to a touch screen panel and a method for fabricating a touch screen panel.

2. Description of the Related Art

A touch screen panel receives an input based on the position of a finger or object contacting a screen. This position corresponds to content displayed on the screen, and an operation is performed relating to this content when contact is made. For example, a touch screen panel may be provided on a front surface of the screen to convert a touch position to an electrical input signal. A touch screen panel may be used with other types of input devices, including but not limited to a keyboard or mouse, for performing various functions.

A variety of touch screen panels have been developed. Examples include a resistance film type, a light-sensing type, and a capacitance type. Among these, the capacitance type touch screen panel converts a touch position to an electrical signal by sensing a change in capacitance between a conductive sensing electrode and a neighboring sensing electrode or a ground electrode when a human hand or an object contacts the touch screen.

SUMMARY

In accordance with one embodiment, a touch screen panel includes a touch substrate; a sensing electrode area including first sensing electrodes and second sensing electrodes on the touch substrate and spaced apart from each other in a first direction and a second direction intersecting the first direction; a pad area electrically connected to the sensing electrode area; and a peripheral wiring area connecting the sensing electrode area and the pad area, wherein each of the first sensing electrodes includes a first sensing metal layer on the touch substrate, a sensing insulation layer on the first sensing metal layer, and a second sensing metal layer on the sensing insulation layer and having a mesh structure, and wherein the second sensing metal layer is thicker than the first sensing metal layer.

Each of the second sensing electrodes may include a third sensing metal layer on a same layer as the sensing metal layer. The panel may include a connector connecting the second sensing electrodes spaced apart from each other in the second direction, wherein the connector may include a connection metal layer on a same layer as each of the first sensing electrode layer and the third sensing metal layer. The panel may include a bridge connecting the first sensing electrodes spaced apart from each other in the first direction, wherein the bridge includes: a bridge insulation layer having a portion on the connector; and a bridge metal layer on the bridge insulation layer and on a same layer as the second sensing metal layer. The bridge metal layer may be thicker than the connection metal layer.

The pad area may include first pads electrically connected to the first sensing electrodes; and second pads electrically connected to the second sensing electrodes, wherein each of first pads may include a first pad metal layer on a same layer as the first sensing metal layer, a pad insulation layer on the pad metal layer and on a same layer as the sensing insulation layer, and a second pad metal layer on the pad insulation layer and on a same layer as the second sensing metal layer, and wherein each of the second pads may include a third pad metal layer on a same layer as each of the first sensing metal layer, the third sensing metal layer, and the first pad metal layer. The second pad metal layer may be thicker than the first pad metal layer.

The peripheral wiring area may include first peripheral wirings connecting the first sensing electrodes and the first pads respectively; and second peripheral wirings connecting the second sensing electrodes and the second pad respectively, wherein each of the first peripheral wirings may include a first wiring metal layer on a same layer as the first sensing metal layer, a wiring insulation layer on the first wiring metal later and on a same layer as the sensing insulation layer, and a second wiring metal layer on the wiring insulation layer and on a same layer as the second sensing metal layer, and wherein each of the second peripheral wirings may include a third wiring metal layer on a same layer as each of the first sensing metal layer, the third sensing metal layer, and the first wiring metal layer. The second wiring metal layer may be thicker than the first wiring metal layer.

Each of the first sensing electrodes may include a first sensing transparent conductive layer between the first sensing metal layer and the sensing insulation layer, and each of the second sensing electrodes may include a second sensing transparent conductive layer on the third sensing metal layer and on a same layer as the first sensing transparent conductive layer.

Each of the first sensing electrodes may include a third sensing transparent conductive layer between the touch substrate and the first sensing metal layer, and each of the second sensing electrodes may include a fourth sensing transparent conductive layer between the touch substrate and the third sensing metal layer and on a same layer as the third sensing transparent conductive layer.

Each of the first sensing transparent conductive layer and the second transparent conductive layer may include at least one of indium tin oxide (ITO), indium zinc oxide (IZO), or and indium gallium zinc oxide (IGZO). Each of the first metal layer and the second sensing metal layer may include at least one of Cu, Ti, Al, Ag, Au, Pt, Mo, a silver-palladium-copper alloy (APC), or a silver-palladium alloy (AP). The panel may include a substrate insulation layer on the touch substrate, wherein each of the sensing electrode area, pad area, and peripheral wiring area may be on the substrate insulation layer.

In accordance with another embodiment, a method for fabricating a touch screen panel includes forming a sensing electrode layer on a touch substrate, the sensing electrode layer including a first metal layer; patterning the sensing electrode layer to form a first pattern, the first pattern including pads, second peripheral wirings, second sensing electrodes, and a connector; forming an insulation layer on the touch substrate; forming a second metal layer on the insulation layer; and patterning the second metal layer and the insulation layer to form first peripheral wirings, first sensing electrodes, and a bridge, wherein the second metal layer is thicker than the first metal layer.

Forming the first pattern may include forming a photoresist layer on the sensing electrode layer; exposing the photoresist layer to light through a first mask and developing the photoresist layer to form a first photoresist pattern; and etching the sensing electrode layer using the first photoresist pattern as a mask to form the first pattern including the pads, the second peripheral wirings, the second sensing electrodes, and the connector.

Forming the second pattern may include forming a photoresist layer on the second metal layer; exposing the photoresist layer to light through a second mask and developing the photoresist layer to form a second photoresist pattern; etching the second metal layer using the photoresist pattern as a mask; etching the insulation layer using the etched second metal layer as a mask to form the second pattern including additional pads, the first peripheral wirings, the first sensing electrodes, and the bridge.

Forming the sensing electrode may include forming a first transparent conductive layer on the first metal layer. Forming the sensing electrode layer may include forming a second transparent conductive layer between the touch substrate and the first metal layer.

In accordance with another embodiment, a touch screen panel including a pad area; a sensing electrode area including first sensing electrodes and second sensing electrodes; and a wiring area connecting the sensing electrode area and the pad area, wherein each of the first sensing electrodes includes a first sensing metal layer, a sensing insulation layer on the first sensing metal layer, and a second sensing metal layer on the sensing insulation layer, the second sensing metal layer thicker than the first sensing metal layer.

BRIEF DESCRIPTION OF THE DRAWINGS

Features will become apparent to those of skill in the art by describing in detail exemplary embodiments with reference to the attached drawings in which:

FIGS. 6A to 6G illustrate different stages of fabrication of a touch screen panel according to one embodiment.

DETAILED DESCRIPTION

Figure 1:
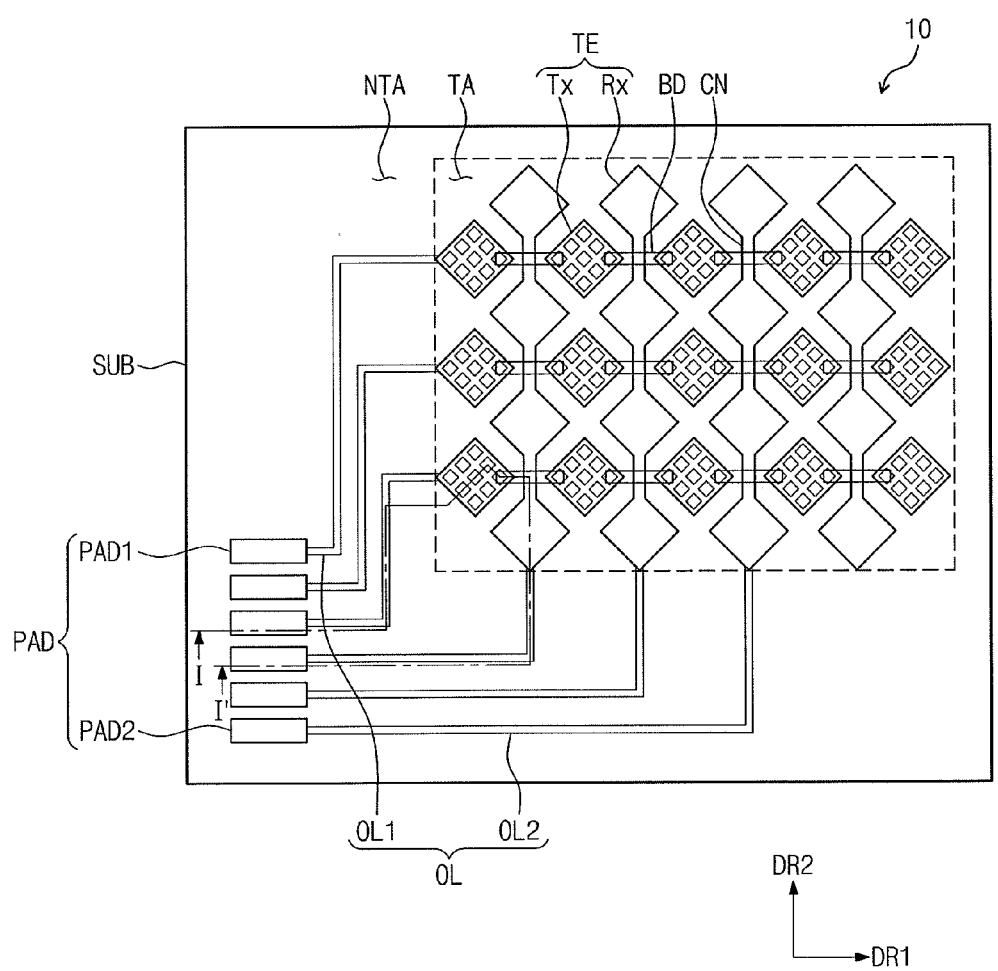
FIG. 1 illustrates an embodiment of a touch screen panel.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
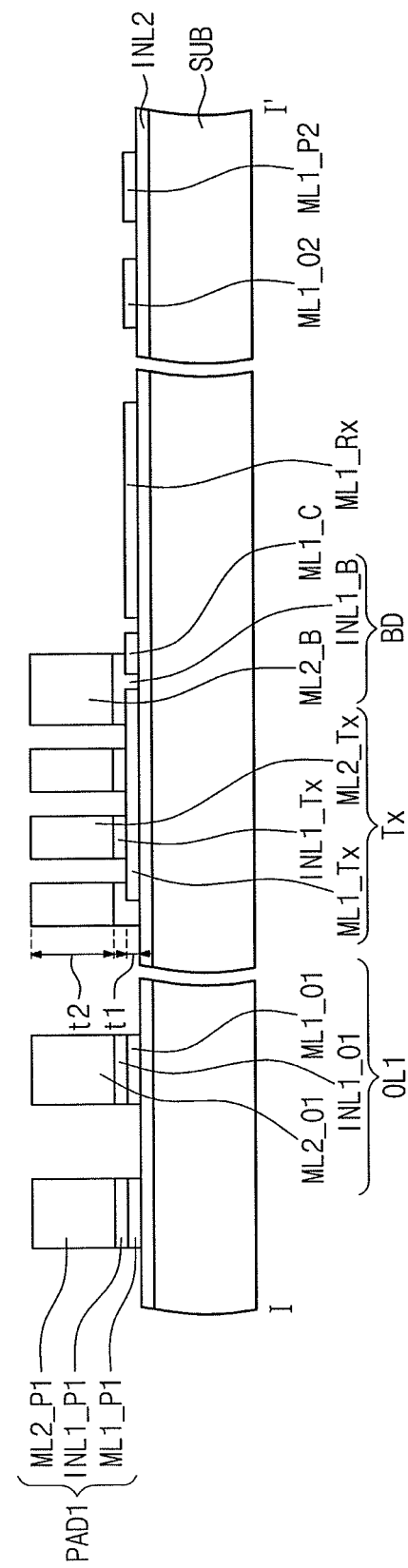
FIG. 2 illustrates an embodiment viewed along section line I-I' in FIG. 1.

FIG. 1 illustrates an embodiment of a touch screen panel 10, and FIG. 2 illustrates a cross-sectional view taken along line I-I' in FIG. 1. Referring to FIGS. 1 and 2, the touch screen panel 10 includes a touch substrate SUB, a sensing electrode TE having first sensing electrodes Tx and second sensing electrodes Rx, a connection unit CN, a pad unit (or pad area) PAD, a peripheral wiring OL, and a bridge BD.

The touch screen panel 10 may further include a substrate insulation layer INL2. The substrate insulation layer INL2 is formed on the touch substrate SUB. The sensing electrode TE and the connection unit CN, the pad unit PAD, the peripheral wiring OL and the bridge BD may be formed on the substrate insulation layer INL2.

A user may input instructions by touching the touch substrate SUB. The touch substrate SUB may be or include a transparent dielectric film. The touch substrate SUB may include, for example, a material such as plastic, glass, ceramic, or a polymer. The touch substrate SUB may be provided, for example, in the form of a plate shape.

The touch substrate SUB includes a touch non-recognizing area NTA and a touch recognizing area TA. The touch non-recognizing area does not sense a touch of a user. The touch recognizing area TA senses a touch of a user. For example, the touch non-recognizing area NTA may surround the touch area TA. The touch recognizing area TA may have a predetermined shape, e.g., approximately rectangular.

The touch non-recognizing area NTA, on which the pad unit PAD and the peripheral wiring OL are disposed is, for example, a dead space area surrounding the touch recognizing area TA. While FIG. 1 illustrates that the pad unit PAD is on a right side of the touch recognizing area TA, the pad unit PAD may be another location (e.g., a left side, an upper side, or a lower side of the touch area TA) in another embodiment.

The pad unit PAD is electrically connected to the sensing electrode TE. The pad unit PAD is formed on the touch substrate SUB, and includes first pad units PAD1 and second pad units PAD2. The first pad units PAD1 are electrically connected to the first sensing electrodes Tx. Each of the first pad units PAD1 includes a first pad metal layer ML1_P1, a pad insulation layer INL1_P1 and a second pad metal layer ML2_P1.

The first pad metal layer ML1_P1 may be formed on the same layer as a first sensing metal layer ML1_Tx. The first pad metal layer ML1_P1 may be formed of the same material as the first sensing metal layer ML1_Tx. The first pad metal layer ML1_P1 may be formed in the same process as the first sensing metal layer ML1_Tx. The first pad metal may include, for example, a material such as Cu, Ti, Al, Ag, Au, Pt, Mo, a silver-palladium-copper alloy (APC), and/or a silver-palladium alloy (AP).

The pad insulation layer INL1_P1 is formed on the first pad metal layer ML1_P1. The pad insulation layer INL1_P1 may be formed on the same layer as the sensing insulation layer INL1_Tx. The pad insulation layer INL1_P1 may be formed of the same material as the sensing insulation layer INL1_Tx. The pad insulation layer INL1_P1 may be formed in the same process as the sensing insulation layer INL1_Tx. The pad insulation layer IN11_P1 may include, e.g., silicon oxide or silicon nitride.

The second pad metal layer ML2_P1 is formed on the pad insulation layer INL1_P1. The second pad metal layer ML2_P1 may be formed on the same layer as a second sensing metal layer ML2_Tx. The second pad metal layer ML2_P1 may be formed of the same material as the second sensing metal layer ML2_Tx. The second pad metal layer ML2_P1 may be formed in the same process as the second sensing metal layer ML2_Tx. The second pad metal layer ML2_P1 may be thicker than the first pad metal layer ML1_P1. The second pad metal layer ML2_P1 may include, for example, Cu, Ti, Al, Ag, Au, Pt, Mo, a silver-palladium-copper alloy (APC), or a silver-palladium alloy (AP).

The second pad units PAD2 are electrically connected to the second sensing electrodes Rx. Each of the second pad units PAD2 includes a third pad metal layer ML1_P2. The third pad metal layer ML1_P2 may be formed on the same layer as each of the first sensing metal layer ML1_Tx, a third sensing metal layer ML1_Rx and the first pad metal layer ML1_P1. The third pad metal layer ML1_P2 may be formed of the same material as each of the first sensing metal layer ML1_Tx, the third sensing metal layer ML1_Rx, and the first pad metal layer ML1_P1. The third pad metal layer ML1_P2 may be formed in the same process as each of the first sensing metal layer ML1_Tx, the third sensing metal layer ML1_Rx, and the first pad metal layer ML1_P1. The third pad metal layer ML1_P2 may include, for example, Cu, Ti, Al, Ag, Au, Pt, Mo, a silver-palladium-copper alloy (APC), or a silver-palladium alloy (AP).

In FIGS. 1 and 2, each of the first pad units PAD1 of the touch screen panel 10 includes the first pad metal layer ML1_P1, the pad insulation layer INL1_P1, and the second pad metal layer ML2_P1. Also, each of the second pad units PAD2 includes the third pad metal layer ML1_P2. In another embodiment, each of the first pad units PAD1 may include the third pad metal layer ML1_P2, and each of the second pad units PAD2 may include the first pad metal layer ML1_P1, the pad insulation layer INL1_P1, and the second pad metal layer ML2_P1.

The peripheral wiring OL connects the sensing electrode TE and the pad unit PAD. The peripheral wiring OL is formed on the touch substrate SUB. The peripheral wiring OL may include first peripheral wirings OL1 and second peripheral wirings OL2.

The first peripheral wirings OL1 connect the first sensing electrodes Tx and the first pad units PAD1, respectively. Each of the first peripheral wirings OL1 includes a first wiring metal layer ML1_O1, a wiring insulation layer INL1_O1, and a second wiring metal layer ML2_O1.

The first wiring metal layer ML1_O1 may be formed on the same layer as the first sensing metal layer ML1_Tx. The first wiring metal layer ML1_O1 may be formed of the same material as the first sensing metal layer ML1_Tx. The first wiring metal layer ML1_O1 may be formed in the same process as the first sensing metal layer ML1_Tx. The first wiring metal layer ML1_O1 may include, for example, Cu, Ti, Al, Ag, Au, Pt, Mo, a silver-palladium-copper alloy (APC), or a silver-palladium alloy (AP).

The wiring insulation layer INL1_O1 is formed on the first wiring metal layer ML1_O1. The wiring insulation layer INL1_O1 may be formed on the same layer as each of the sensing insulation layer INL1_Tx and the pad insulation layer INL1_P1. The wiring insulation layer INL1_O1 may be formed of the same material as each of the sensing insulation layer INL1_Tx and the pad insulation layer INL1_P1. The wiring insulation layer INL1_O1 may be formed in the same process as each of the sensing insulation layer INL1_Tx and the pad insulation layer INL1_P1. The wiring insulation layer INL1_O1 may include, for example, silicon oxide or silicon nitride.

The second wiring metal layer ML2_O1 is formed on the wiring insulation layer INL1_O1. The second wiring metal layer ML2_O1 may be formed on the same layer as each of the second sensing metal layer ML2_Tx and the second pad metal layer ML2_P1. The second wiring metal layer ML2_O1 may be formed of the same material as each of the second sensing metal layer ML2_Tx and the second pad metal layer ML2_P1. The second wiring metal layer ML2_O1 may be formed in the same process as each of the second sensing metal layer ML2_Tx and the second pad metal layer ML2_P1. The second wiring metal layer ML2_O1 may be thicker than the first wiring metal layer ML1_O1. The second wiring metal layer ML2_O1 may include, for example, Cu, Ti, Al, Ag, Au, Pt, Mo, a silver-palladium-copper alloy (APC), or a silver-palladium alloy (AP).

The second peripheral wirings connect the second sensing electrodes Rx and the second pad units PAD2, respectively. Each of the second peripheral wirings OL2 includes a third wiring metal layer ML1_O2. The third wiring metal layer ML1_O2 may be formed on the same layer as each of the first sensing metal layer ML1_Tx, the third sensing metal layer ML1_Rx, and the first wiring metal layer ML1_O1. The third wiring metal layer ML1_O2 may be formed of the same material as each of the first sensing metal layer ML1_Tx, the third sensing metal layer ML1_Rx, and the first wiring metal layer ML1_O1. The third wiring metal layer ML1_O2 may be formed in the same process as each of the first sensing metal layer ML1_Tx, the third sensing metal layer ML1_Rx, and the first wiring metal layer ML1_O1.

In FIGS. 1 and 2, each of the first peripheral wirings OL1 of the touch screen panel 10 includes the first wiring metal layer ML1_O1, the wiring insulation layer INL1_O1, and the second wiring metal layer ML2_O1. Also, each of the second peripheral wirings includes the third wiring metal layer ML1_O2. In another embodiment, each of the first peripheral wirings OL1 may include the third wiring metal layer ML1_O2, and each of the second peripheral wirings OL2 may include the first wiring metal layer ML1_O1, the wiring insulation layer INL1_O1, and the second wiring metal layer ML2_O1.

The touch recognizing area TA is an area on which the sensing electrode TE is disposed, and senses a touch input by a user through the sensing electrode TE. When a touch input is generated in relation to the touch by the user, capacitance is varied in the sensing electrode TE, for example, between the first sensing electrodes Tx and the second sensing electrodes Rx in the sensing electrode TE. In accordance with this variation in capacitance, a sensing signal supplied to the first sensing electrodes Tx may be delayed and supplied to the second sensing electrodes Rx. The touch screen panel 10 may sense touch coordinate(s) from a delay value of the sensing signal.

The sensing electrode TE includes the first sensing electrodes Tx and the second sensing electrodes Rx. The first sensing electrodes Tx and the second sensing electrodes Rx are electrically insulated from each other. Each of the first sensing electrodes Tx and the second sensing electrode Rx may have various approximate shapes, e.g., rhombus, square, rectangular, circle, or an atypical shape (for example, a shape including tangled branches, e.g., a dendrite structure).

The first sensing electrodes Tx and the second sensing electrodes Rx are disposed in a matrix configuration having a plurality of rows extending in a first direction (e.g., a DR1 direction in FIG. 1) and a plurality of columns extending in a second direction (e.g., a DR2 direction in FIG. 1).

The first sensing electrodes Tx are arranged spaced apart from each other in the first direction (for example, the DR1 direction in FIG. 1) and the second direction (for example, the DR2 direction in FIG. 1) intersecting with the first direction (for example, the DR1 direction in FIG. 1), respectively. The first sensing electrodes Tx spaced apart from each other in the first direction (for example, the DR1 direction in FIG. 1) are connected to each other by the bridge BD.

The first sensing electrodes Tx include a first sensing metal layer ML1_Tx, a sensing insulation layer INL1_Tx, and a second sensing metal layer ML2_Tx.

The first sensing metal layer ML1_Tx is formed on the touch substrate SUB. The first sensing metal layer ML1_Tx may be formed on the same layer as each of the first pad metal layer ML1_P1 and the first wiring metal layer ML1_O1. The first sensing metal layer ML1_Tx may be formed of the same material as each of the first pad metal layer ML1_P1 and the first wiring metal layer ML1_O1. The first sensing metal layer ML1_Tx may be formed in the same process as each of the first pad metal layer ML1_P1 and the first wiring metal layer ML1_O1. The first sensing metal layer ML1_Tx may include, for example, Cu, Ti, Al, Ag, Au, Pt, Mo, a silver-palladium-copper alloy (APC), or a silver-palladium alloy (AP).

The sensing insulation layer INL1_Tx is formed on the touch substrate SUB and the first sensing metal layer ML1_Tx. The sensing insulation layer INL1_Tx may be formed on the same layer as each of the pad insulation layer INL1_P1 and the wiring insulation layer INL1_O1. The sensing insulation layer INL1_Tx may be formed of the same material as each of the pad insulation layer INL1_P1 and the wiring insulation layer INL1_O1. The sensing insulation layer INL1_Tx may be formed in the same process as each of the pad insulation layer INL1_P1 and the wiring insulation layer INL1_O1. The wiring insulation layer INL1_O1 may include, for example, silicon oxide or silicon nitride.

The second sensing metal layer ML2_Tx is formed on the sensing insulation layer INL1_Tx. The second sensing metal layer ML2_Tx may be formed on the same layer as each of the second pad metal layer ML2_P1 and the second wiring metal layer ML2_O1. The second sensing metal layer ML2_Tx may be formed of the same material as each of the second pad metal layer ML2_P1 and the second wiring metal layer ML2_O1. The second sensing metal layer ML2_Tx may be formed in the same process as each of the second pad metal layer ML2_P1 and the second wiring metal layer ML2_O1. The second sensing metal layer ML2_Tx may include, for example, Cu, Ti, Al, Ag, Au, Pt, Mo, a silver-palladium-copper alloy (APC), or a silver-palladium alloy (AP).

The second sensing metal layer ML2_Tx has a mesh structure. The second sensing metal layer ML2_Tx may have a thickness t2 greater than the thickness t1 of the first sensing metal layer ML1_Tx.

In one embodiment, the touch screen panel may include the second sensing metal layer ML2_Tx having the thickness (t2 of FIG. 2) greater than that (t1 of FIG. 2) of the first sensing metal layer ML1_Tx. This may reduce resistance of the first sensing electrodes Tx and may thereby improve response speed.

The bridge BD connects the first sensing electrodes Tx spaced apart from each other in the first direction (for example, the DR1 direction in FIG. 1). The bridge BD includes a bridge insulation layer INL1_B and a bridge metal layer ML2_B.

At least a portion of the bridge insulation layer INL1_B is formed on the connection unit CN. The bridge insulation layer INL1_B may cover the connection unit CN. The bridge insulation layer INL1_B1 may include, for example, silicon oxide or silicon nitride.

The bridge metal layer ML2_B is formed on the bridge insulation layer INL1-M. The bridge metal layer ML2_B may be formed on the same layer as each of the second sensing metal layer ML2_Tx, the second pad metal layer ML2_P1 and the second wiring metal layer ML2_O1. The bridge metal layer ML2_B may be formed of the same material as each of the second sensing metal layer ML2_Tx, the second pad metal layer ML2_P1 and the second wiring metal layer ML2_O1. The bridge metal layer ML2_B may be formed in the same process as each of the second sensing metal layer ML2_Tx, the second pad metal layer ML2_P1 and the second wiring metal layer ML2_O1. The bridge metal layer ML2_B may include, for example, Cu, Ti, Al, Ag, Au, Pt, Mo, a silver-palladium-copper alloy (APC), or a silver-palladium alloy (AP).

Among the first sensing electrodes Tx, the first sensing electrode TX, disposed on one end of the first sensing electrodes Tx constituting one row that extends in the first direction (for example, the DR1 direction in FIG. 1), is electrically connected to the first pad units PAD1. In one embodiment, each of first sensing electrodes Tx, disposed on both ends of the first sensing electrodes Tx constituting one row that extends in the first direction (for example, the DR1 direction in FIG. 1), may be electrically connected to the first pad unit PAD1.

Among the first sensing electrodes Tx, the first sensing electrode Tx, disposed on one end of the first sensing electrodes Tx constituting one row that extends in the first direction (for example, the DR1 direction in FIG. 1), is connected to the first peripheral wiring OL1 and thus may be electrically connected to the first pad unit PAD1. In one embodiment, each of the first sensing electrodes Tx, disposed on both ends of the first sensing electrodes Tx constituting one row that extends in the first direction (for example, the DR1 direction in FIG. 1), may be connected to the first peripheral wiring OL1 and thus may be electrically connected to the first pad unit PAD1.

The second sensing electrodes Rx are arranged spaced apart from each other in the first direction (for example, the DR1 direction in FIG. 1) and the second direction (for example, the DR2 direction in FIG. 1).

The second sensing electrodes Rx includes the third sensing metal layer ML1_Rx formed on the touch substrate SUB. The third sensing metal layer ML1_Rx may be formed on the same layer as each of the first sensing metal layer ML1_Tx, the first pad metal layer ML1_P1 and the first wiring metal layer ML1_O1. The third sensing metal layer ML1_Rx may be formed of the same material as each of the first sensing metal layer ML1_Tx and the first pad metal layer ML1_P1 and the first wiring metal layer ML1_O1. The third sensing metal layer ML1_Rx may be formed in the same process as each of the first sensing metal layer ML1_Tx, the first pad metal layer ML1_P1 and the first wiring metal layer ML1_O1. The third sensing metal layer ML1_Rx may include, Cu, Ti, Al, Ag, Au, Pt, Mo, a silver-palladium-copper alloy (APC), or a silver-palladium alloy (AP).

The connection unit CN connects the second sensing electrodes Rx spaced apart from each other in the second direction (for example, the DR2 direction in FIG. 1). The connection unit CN includes a connection metal layer ML1_C formed on the touch substrate SUB. The connection metal layer ML1_C may be formed on the same layer as each of the first sensing metal layer ML1_Tx, the third sensing metal layer ML1_Rx, the first pad metal layer ML1_P1, and the first wiring metal layer ML1_O1. The connection metal layer ML1_C may be formed of the same material as each of the first sensing metal layer ML1_Tx, the third sensing metal layer ML1_Rx, the first pad metal layer ML1_P1, and the first wiring metal layer ML1_O1. The connection metal layer ML1_C may be formed in the same process as each of the first sensing metal layer ML1_Tx, the third sensing metal layer ML1_Rx, the first pad metal layer ML1_P1, and the first wiring metal layer ML1_O1. The connection metal layer ML1_C may include, for example, Cu, Ti, Al, Ag, Au, Pt, Mo, a silver-palladium-copper alloy (APC), or a silver-palladium alloy (AP).

Among the second sensing electrodes Rx, the second sensing electrode Rx, disposed on one end of the second sensing electrodes Rx constituting one column that extends in the second direction (for example, the DR2 direction in FIG. 1), is electrically connected to the second pad unit PAD2. In one embodiment, each of the second sensing electrodes Rx disposed on both ends of the second sensing electrodes Rx constituting one column that extends in the second direction (for example, the DR2 direction in FIG. 1), may be electrically connected to the second pad unit PAD2.

Among the second sensing electrodes Rx, the second sensing electrode Rx, disposed on one end of the second sensing electrodes Rx constituting one column that extends in the first direction (for example, the DR2 direction in FIG. 1), is to connected to the second peripheral wiring OL2 and thus is electrically connected to the second pad unit PAD2. In one embodiment, each of the second sensing electrodes Rx disposed on both ends of the second sensing electrodes Rx constituting one column that extends in the second direction (for example, the DR2 direction in FIG. 1), may be connected to the second peripheral wiring OL2 and thus is electrically connected to the second pad unit PAD2.

In FIGS. 1 and 2, each of the first sensing electrodes Tx of the touch screen panel 10 includes the first sensing metal layer ML1_Tx, the sensing insulation layer INL1_Tx, and the second sensing metal layer ML2_Tx having the mesh structure. The first sensing electrodes Tx are spaced apart from each other in the first direction (for example, the DR1 in FIG. 1) and are connected to each other by the bridge BD. Each of the second sensing electrodes Rx includes the third sensing metal layer ML1_Rx. The second sensing electrodes Rx are spaced apart from each other in the second direction (for example, the second direction DR2 in FIG. 1) and are connected to each other by the connection unit CN.

In another embodiment, each of the first sensing electrodes Tx may include the third sensing metal layer ML1_Rx. The first sensing electrodes Tx spaced apart from each other in the first direction (for example, the first direction in FIG. 1) may be connected to each other by the connection unit CN. Each of the second sensing electrodes Rx may include the first sensing metal layer ML1_Tx, the sensing insulation layer INL1_Tx, and the second sensing metal layer ML2_Tx having the mesh structure. The second sensing electrodes Rx spaced apart from each other in the second direction (for example, the second direction DR2 in FIG. 1) may be connected to each other by the bridge BD.

The touch screen panel 10 may be used for a variety of displays. Examples include field emission displays (FEDs), plasma display panels (PDPs), electroluminescence devices (ELs), an delectrophoretic displays. In one embodiment, the touch substrate SUB in the touch screen panel 10 may be selected as one of substrates of these display devices.

In one type of touch screen panel, a pad unit, a peripheral wiring, a sensing electrode, and a connection unit are formed in different processes. However, in accordance with one or more embodiments, the first pad units PAD1, the first peripheral wirings OL1, the first sensing electrodes Tx, and the bridge BD are formed in a same process. Also, the second pad units PAD2, the second peripheral wirings OL2, the second sensing electrodes Rx, and the connection unit CN may be formed in the same process. As a result, the number of mask processes may be reduced. Also, costs and tact time (e.g., manufacturing time required per product unit for achieving a daily production target amount) may be reduced.

The touch screen panel 10 according to FIG. 1 and the embodiment of FIG. 3 will now be described. Hereinafter, points that differ from the embodiment according to FIGS. 1 and 2 will mainly be described.

Figure 3:
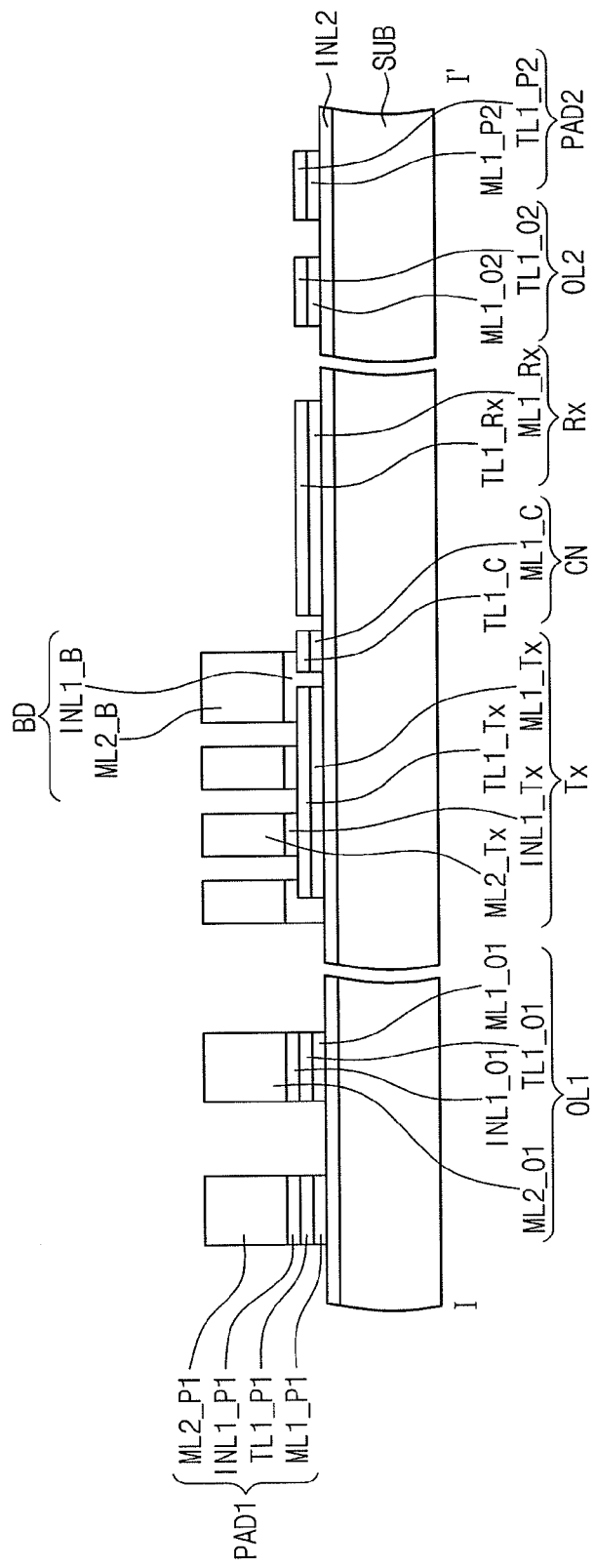
FIG. 3 illustrates another embodiment as viewed along section line I-I' in FIG. 1.

FIG. 3 illustrates a cross-sectional of another embodiment of a touch screen panel view taken along a line I-I' of FIG. 1. Referring to FIGS. 1 and 3, the touch screen panel 10 includes a touch substrate SUB, a sensing electrode TE, a connection unit CN, a pad unit PAD, a peripheral wiring OL, and a bridge BD.

The touch screen panel 10 may further include a substrate insulation layer INL2 formed on the touch substrate SUB. The sensing electrode TE, the connection unit CN, the pad unit PAD, the peripheral wiring OL, and the bridge BD may be formed on the substrate insulation layer INL2.

Each of first pad units PAD1 includes a first pad metal layer ML1_P1, a first pad transparent conductive layer TL1_P1, a pad insulation layer INL1_P1, and a second pad metal layer ML2_P1. The first pad transparent conductive layer TL1_P1 is formed between the first pad metal layer ML1_P1 and the pad insulation layer INL1_P1.

Each of second pad units PAD2 includes a third pad metal layer ML1_P2 and a second pad transparent conductive layer TL1_P2. The second pad transparent conductive layer TL1_P2 is formed on the third pad metal layer ML1_P2. The second pad transparent conductive layer TL1_P2 may be formed on the same layer as the first pad transparent conductive layer TL1_P1. The second pad transparent conductive layer TL1_P2 may be formed of the same material as the first pad transparent conductive layer TL1_P1. The second pad transparent conductive layer TL1_P2 may be formed in the same material as the first pad transparent conductive layer TL1_P1.

Each of the first pad transparent conductive layer TL1_P1 and the second pad transparent conductive layer TL1_P2 may be formed of transparent conductive oxide (TCO). The transparent conductive oxide may include, for example, at least one of indium tin oxide (ITO), indium zinc oxide (IZO), or indium gallium zinc oxide (IGZO).

Referring to FIGS. 1 and 3, each of the first pad units PAD1 of the touch screen panel 10 includes the first pad metal layer ML1_P1, the first pad transparent conductive layer TL1_P1, the pad insulation layer INL1_P1, and the second pad metal layer ML2_P1. Also, each of the second pad units PAD2 includes the third pad metal layer ML1_P2 and the second pad transparent conductive layer TL1_P2. In one embodiment, each of the first pad units PAD1 may include the third pad metal layer ML1_P2 and the second pad transparent conductive layer TL1_P2. Also, each of the second pad units PAD2 may include the first pad metal layer ML1_P1, the first pad transparent conductive layer TL1_P1, the pad insulation layer INL1_P1, and the second pad metal layer ML2_P1.

Each of the first peripheral wirings OL1 includes a first wiring metal layer ML1_O1, a first wiring transparent conductive layer TL1_O1, a wiring insulation layer INL_O1, and a second wiring metal layer ML2_O1. The first wiring transparent conductive layer TL1_O1 is formed between the first wiring metal layer ML1_O1 and the wiring insulation layer INL1_O1.

Each of the second peripheral wirings OL2 includes a third wiring metal layer ML1_O2 and a second wiring transparent conductive layer TL1_O2. The second wiring transparent conductive layer TL1_O2 is formed on the third wiring metal layer ML1_O2. The second wiring transparent conductive layer TL1_O2 may be formed on the same layer as the first wiring transparent conductive layer TL1_O1. The second wiring transparent conductive layer TL1_O2 may be formed of the same material as the first wiring transparent conductive layer TL1_O1. The second wiring transparent conductive layer TL1_O2 may be formed in the same process as the first wiring transparent conductive layer TL1_O1.

Each of the first wiring transparent conductive layer TL1_O1 and the second wiring transparent conductive layer TL1_O2 may be formed of transparent conductive oxide (TCO). The transparent conductive oxide may include, for example, indium tin oxide (ITO), indium zinc oxide (IZO), or indium gallium zinc oxide (IGZO).

In FIGS. 1 and 3, each of the first peripheral wirings OL1 of the touch screen panel 10 includes the first wiring metal layer ML1_O1, the first wiring transparent conductive layer TL1_O1, the wiring insulation layer INL1_O1, and the second wiring metal layer ML2_O1. Also, each of the second peripheral wirings includes the third wiring metal layer ML1_O2 and the second wiring transparent conductive layer TL1_O2. In one embodiment, each of the first peripheral wirings OL1 may include the third wiring metal layer ML1_O2 and the second wiring transparent conductive layer TL1_O2. Also, each of the second peripheral wirings OL2 may include the first wiring metal layer ML1_O1, the first wiring transparent conductive layer TL1_O1, the wiring insulation layer INL1_O1, and the second wiring metal layer ML2_O1.

The first sensing electrodes Tx include a first sensing metal layer ML1_Tx, a first sensing transparent conductive layer TL1_Tx, a sensing insulation layer INL1_Tx, and a second sensing metal layer ML2_Tx. The first sensing transparent conductive TL1_Tx is formed between the first sensing metal layer ML1_Tx and the sensing insulation layer INL1_Tx. The first sensing transparent conductive layer TL1_Tx may be formed on the same layer as each of the first pad transparent conductive layer TL1_P1, the second pad transparent conductive layer TL1_P2, the first wiring transparent conductive layer TL1_O1, and the second wiring transparent conductive layer TL1_O2. The first sensing transparent conductive layer TL1_Tx may be formed of the same material as each of the first pad transparent conductive layer TL1_P1, the second pad transparent conductive layer TL1_P2, the first wiring transparent conductive layer TL1_O1, and the second wiring transparent conductive layer TL1_O2. The first sensing transparent conductive layer TL1_Tx may be formed in the same process as each of the first pad transparent conductive layer TL1_P1, the second pad transparent conductive layer TL1_P2, the first wiring transparent conductive layer TL1_O1, and the second wiring transparent conductive layer TL1_O2.

The second sensing metal layer ML2_Tx has a mesh structure. The second sensing metal layer ML2_Tx may have a thickness (t2 of FIG. 2) greater than that (t1 of FIG. 2) of the first sensing metal layer ML1_Tx.

One type of touch screen panel, that includes a sensing electrode formed of a transparent conductive layer, has limitations. For example, a recognition speed is low due to an RC delay, Also, a crack may form due to bending of the sensing electrode. Also, a panel that includes a sensing electrode formed of a metal layer having a mesh shape and a transparent conductive layer may have limitations. For example, a pattern may be easily visible to the human eye in an aspect of visibility due to high reflectivity of the metal. Also, glaring may occur due to high reflectivity of light from an external light source and a haze value may exist.

In accordance with one or more embodiments of the touch screen panel, the second sensing metal layer ML2_Tx has a thickness (t2 of FIG. 2) greater than (t1 of FIG. 2) the first sensing metal layer ML1_Tx. As a result, resistance of the first sensing electrodes Tx is reduced and response speed may be improved. Also, reflection by the first sensing transparent conductive layer TL1_Tx may be reduced or prevented and absorbance may be improved, to thereby improve invisibleness of the first sensing transparent conductive layer TL1_Tx. As a result, contrast of the touch screen panel may be improved.

The second sensing electrodes Rx include a third sensing metal layer ML1_Rx and a second sensing transparent conductive layer TL1_Rx. The second sensing transparent conductive layer TL1_Rx is formed on the third sensing metal layer ML1_Rx. The second sensing transparent conductive layer TL1_Rx may be formed on the same layer as each of the first sensing transparent conductive layer TL1_Tx, the first pad transparent conductive layer TL1_P1, the second pad transparent conductive layer TL1_P2, the first wiring transparent conductive layer TL1_O1, and the second wiring transparent conductive layer TL1_O2. The second sensing transparent conductive layer TL1_Rx may be formed of the same material as each of the first sensing transparent conductive layer TL1_Tx, the first pad transparent conductive layer TL1_P1, the second pad transparent conductive layer TL1_P2, the first wiring transparent conductive layer TL1_O1, and the second wiring transparent conductive layer TL1_O2. The second sensing transparent conductive layer TL1_Rx may be formed in the same process as each of the first sensing transparent conductive layer TL1_Tx, the first pad transparent conductive layer TL1_P1, the second pad transparent conductive layer TL1_P2, the first wiring transparent conductive layer TL1_O1 and the second wiring transparent conductive layer TL1_O2.

Each of the first sensing transparent conductive layer TL1_Tx and the second sensing transparent conductive layer TL1_Rx may be formed of transparent conductive oxide (TCO). The transparent conductive oxide may include, for example, at least one of indium tin oxide (ITO), indium zinc oxide (IZO), or indium gallium zinc oxide (IGZO).

The connection unit CN includes a connection metal layer ML_C and a first connection transparent conductive layer TL1_C. The first connection transparent conductive layer TL1_C may be formed on the connection metal layer ML1_C. The first connection transparent conductive layer TL1_C may be formed on the same layer as each of the first sensing transparent conductive layer TL1_Tx, the first pad transparent conductive layer TL1_P1, the second pad transparent conductive layer TL1_P2, the first wiring transparent conductive layer TL1_O1, and the second wiring transparent conductive layer TL1_O2. The first connection transparent conductive layer TL1_C may be formed of the same material as each of the first sensing transparent conductive layer TL1_Tx, the first pad transparent conductive layer TL1_P1, the second pad transparent conductive layer TL1_P2, the first wiring transparent conductive layer TL1_O1, and the second wiring transparent conductive layer TL1_O2. The first connection transparent conductive layer TL1_C may be formed in the same process as each of the first sensing transparent conductive layer TL1_Tx, the first pad transparent conductive layer TL1_P1, the second pad transparent conductive layer TL1_P2, the first wiring transparent conductive layer TL1_O1, and the second wiring transparent conductive layer TL1_O2.

The first connection transparent conductive layer TL1_C is formed of transparent conductive oxide (TCO). The transparent conductive oxide may include, for example, at least one of indium tin oxide (ITO), indium zinc oxide (IZO), or indium gallium zinc oxide (IGZO).

In FIGS. 1 and 3, each of the first sensing electrodes Tx of the touch screen panel 10 includes the first sensing metal layer ML1_Tx, the first sensing transparent conductive layer TL1_Tx, the sensing insulation layer INL1_Tx, and the second sensing metal layer ML2_Tx having the mesh structure. The first sensing electrodes Tx spaced apart from each other in the first direction (for example, the DR1 in FIG. 1) are connected to each other by the bridge BD. Also, each of the second sensing electrodes Rx includes the third sensing metal layer ML1_Rx and the second sensing transparent conductive layer TL1_Rx, and the second sensing electrodes Rx spaced apart from each other in the second direction (for example, the direction DR2 in FIG. 1) are connected to the each other by the connection unit CN.

In accordance with one or more embodiments, each of the first sensing electrodes Tx includes the third sensing metal layer ML1_Rx, the second sensing transparent conductive layer TL1_Rx, and the first sensing electrodes Tx spaced apart from each other in the first direction (for example, the first direction in FIG. 1). The first sensing electrodes Tx may be connected to each other by the connection unit CN. Each of the second sensing electrodes Rx may include the first sensing metal layer ML1_Tx, the sensing transparent conductive layer TL1_Tx, the sensing insulation layer INL1_Tx, and the second sensing metal layer ML2_Tx having the mesh structure. The second sensing electrodes Rx, spaced apart from each other in the second direction (for example, the second direction DR2 in FIG. 1), may be connected to each other by the bridge BD.

In one type of touch screen panel, a pad unit, a peripheral wiring, a sensing electrode, a bridge BD, and a connection unit CN are formed in different processes. However, in accordance with one or more embodiments of the touch screen panel 10, the first pad units PAD1, the first peripheral wirings OL1, the first sensing electrodes Tx, and the bridge BD are formed in the same process. Also, the second pad units PAD2, the second peripheral wirings OL2, the second sensing electrodes Rx, and the connection unit CN are formed in the same process. As a result, the number of mask processes may be reduced. Also, costs and tact time (e.g., manufacturing time required per product unit for achieving a daily production target amount) may be reduced.

Figure 4:
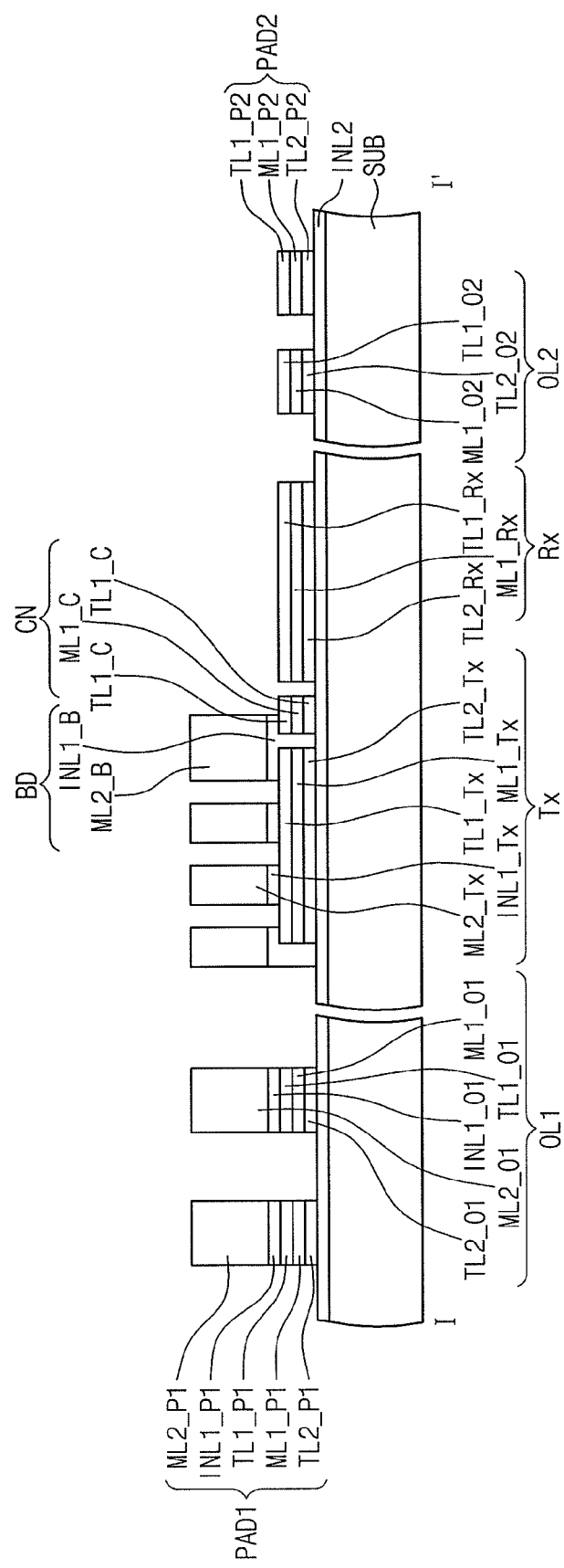
FIG. 4 illustrates another embodiment as viewed along section line I-I' in FIG. 1.

FIGS. 1 and 4 illustrate another embodiment of a touch screen panel 10. FIG. 4 illustrates a schematic cross-sectional view taken along a line I-I' of FIG. 1. Points that differ from the embodiments of FIGS. 1 and 2 will mainly be described.

Referring to FIGS. 1 and 4, the touch screen panel 10 includes a touch substrate SUB, a sensing electrode TE, a connection unit CN, a pad unit PAD, a peripheral wiring OL and a bridge BD. The touch screen panel 10 may further include a substrate insulation layer INL2 formed on the touch substrate SUB. Each of the sensing electrode TE, the connection unit CN, the pad unit PAD, the peripheral wiring OL, and the bridge BD may be formed on the substrate insulation layer INL2.

Each of the first pad units PAD1 includes a third pad transparent conductive layer TL2_P1, a first pad metal layer ML1_P1, a first pad transparent conductive layer TL1_P1, a pad insulation layer INL1_P1, and a second pad metal layer ML2_P1. The third pad transparent conductive TL2_P1 is formed between the touch substrate SUB and the first pad metal layer ML1_P1.

Each of the second pad units PAD2 includes a fourth transparent conductive layer TL2_P2, a third pad metal layer ML1_P2, and a second pad transparent conductive layer TL1_P2. The fourth pad transparent conductive TL2_P2 is formed between the touch substrate SUB and the third pad metal layer ML1_P2. The fourth pad transparent conductive layer TL2_P2 may be formed on the same layer as the third pad transparent conductive layer TL2_P1. The fourth pad transparent conductive layer TL2_P2 may be formed of the same material as the third pad transparent conductive layer TL2_P1. The fourth pad transparent conductive layer TL2_P2 may be formed in the same material as the third pad transparent conductive layer TL2_P1.

Each of the third pad transparent conductive layer TL2_P1 and the fourth pad transparent conductive layer TL2_P2 may be formed of transparent conductive oxide (TCO). The transparent conductive oxide may include, for example, at least one of indium tin oxide (ITO), indium zinc oxide (IZO), or indium gallium zinc oxide (IGZO).

In FIGS. 1 and 4, each of the first pad units PAD1 of the touch screen panel 10 includes the third pad transparent conductive layer TL2_P1, the first pad metal layer ML1_P1, the first pad transparent conductive layer TL1_P1, the pad insulation layer INL1_P1, and the second pad metal layer ML2_P1. Also, each of the second pad units PAD1 includes the fourth pad transparent conductive layer TL2_P2, the third pad metal layer ML1_P2, and the second pad transparent conductive layer TL1_P2.

In accordance with one or more embodiments, each of the first pad units PAD1 may include the fourth pad transparent conductive layer TL2_P2, the third pad metal layer ML1_P2, and the second pad transparent conductive layer TL1_P2. Each of the second pad units PAD1 may include the third pad transparent conductive layer TL2_P1, the first pad metal layer ML1_P1, the first pad transparent conductive layer TL1_P1, the pad insulation layer INL1_P1, and the second pad metal layer ML2_P1.

Each of the first peripheral wirings OL1 includes a third wiring transparent conductive layer TL2_O1, a first wiring metal layer ML1_O1, a first wiring transparent conductive layer TL1_O1, a wiring insulation layer INL_O1, and a second wiring metal layer ML2_O1. The third wiring transparent conductive TL2_O1 is formed between the touch substrate SUB and the first wiring metal layer ML1_O1.

Each of the second peripheral wirings OL2 includes a fourth wiring transparent conductive layer TL2_O2, a third wiring metal layer ML1_O2, and a second wiring transparent conductive layer TL1_O2. The fourth wiring transparent conductive TL2_O2 is formed between the touch substrate SUB and the third wiring metal layer ML1_O2. The fourth wiring transparent conductive layer TL2_O2 may be formed on the same layer as the third wiring transparent conductive layer TL2_O1. The fourth wiring transparent conductive layer TL2_O2 may be formed of the same material as the third wiring transparent conductive layer TL2_O1. The fourth wiring transparent conductive layer TL2_O2 may be formed in the same process as the third wiring transparent conductive layer TL2_O1.

Each of the third wiring transparent conductive layer TL2_O1 and the fourth wiring transparent conductive layer TL2_O2 may be formed of transparent conductive oxide (TCO). The transparent conductive oxide may include, for example, at least one of indium tin oxide (ITO), indium zinc oxide (IZO), or indium gallium zinc oxide (IGZO).

In FIGS. 1 and 4, each of the first peripheral wirings OL1 of the touch screen panel 10 includes the third wiring transparent conductive layer TL2_O1, the first wiring metal layer ML1_O1, the first wiring transparent conductive layer TL1_O1, the wiring insulation layer INL1_O1, and the second wiring metal layer ML2_O1. Each of the second peripheral wirings OL2 includes the fourth wiring transparent conductive layer TL2_O2, the third wiring metal layer ML1_O2, and the second wiring transparent conductive layer TL1_O2.

In another embodiment, each of the first peripheral wirings OL1 may include the fourth wiring transparent conductive layer TL2_O2, the third wiring metal layer ML1_O2, and the second wiring transparent conductive layer TL1_O2. Also, each of the second peripheral wirings OL2 may include the third wiring transparent conductive layer TL2_O1, the first wiring metal layer ML1_O1, the first wiring transparent conductive layer TL1_O1, the wiring insulation layer INL1_O1, and the second wiring metal layer ML2_O1.

The first sensing electrodes Tx include a third sensing transparent conductive layer TL2_Tx, a first sensing metal layer ML1_Tx, a first sensing transparent conductive layer TL1_Tx, a sensing insulation layer INL1_Tx, and a second sensing metal layer ML2_Tx. The third sensing transparent conductive TL2_Tx is formed between the touch substrate SUB and the first sensing metal layer ML1_Tx. The third sensing transparent conductive layer TL2_Tx may be formed on the same layer as each of the third pad transparent conductive layer TL2_P1, the fourth pad transparent conductive layer TL2_P2, the third wiring transparent conductive layer TL2_O1, and the fourth wiring transparent conductive layer TL2_O2.

The third sensing transparent conductive layer TL2_Tx may be formed of the same material as each of the third pad transparent conductive layer TL2_P1, the fourth pad transparent conductive layer TL2_P2, the third wiring transparent conductive layer TL2_O1, and the fourth wiring transparent conductive layer TL2_O2. The third sensing transparent conductive layer TL2_Tx may be formed in the same process as each of the third pad transparent conductive layer TL2_P1, the fourth pad transparent conductive layer TL2_P2, the third wiring transparent conductive layer TL2_O1, and the fourth wiring transparent conductive layer TL2_O2.

The second sensing metal layer ML2_Tx has a mesh structure. The second sensing metal layer ML2_Tx may have a thickness (t2 of FIG. 2) greater than that (t1 of FIG. 2) of the first sensing metal layer ML1_Tx.

In one type of touch screen panel, a sensing electrode formed of a transparent conductive layer has limitations in that a recognition speed is low due to an RC delay. Also, a crack may form due to bending of the sensing electrode. In this type of panel or other panels which have been proposed, a sensing electrode formed of a metal layer having a mesh shape and a transparent conductive layer have limitations. For example, a pattern is easily visible to the human eye in an aspect of visibility due to high reflectivity of the metal layer. Also, glaring occurs due to high reflectivity of light from an external light source and a haze value may exist.

In accordance with one or more embodiments, the touch screen panel 10 may include the second sensing metal layer ML2_Tx having the thickness (t2 of FIG. 2) greater than that (t1 of FIG. 2) of the first sensing metal layer ML1_Tx. As a result, resistance of the first sensing electrodes Tx may be reduced, thereby improving response speed. Also, reflection by the first sensing transparent conductive layer TL1_Tx may be reduced or prevented and absorbance may be improved. As a result, invisibleness of the first sensing transparent conductive layer TL1_Tx may be improved. Therefore, touch screen panel 10 may have improved contrast characteristics.

The second sensing electrodes Rx include a fourth sensing transparent conductive layer TL2_Rx, a third sensing metal layer ML1_Rx, and a second sensing transparent conductive layer TL1_Rx. The fourth sensing transparent conductive layer TL2_Rx is formed between the touch substrate SUB and the third sensing metal layer ML1_Rx. The fourth sensing transparent conductive layer TL2_Rx may be formed on the same layer as each of the third sensing transparent conductive layer TL2_Tx, the third pad transparent conductive layer TL2_P1, the fourth pad transparent conductive layer TL2_P2, the third wiring transparent conductive layer TL2_O1, and the fourth wiring transparent conductive layer TL2_O2.

The fourth sensing transparent conductive layer TL2_Rx may be formed of the same material as each of the third sensing transparent conductive layer TL2_Tx, the third pad transparent conductive layer TL2_P1, the fourth pad transparent conductive layer TL2_P2, the third wiring transparent conductive layer TL2_O1, and the fourth wiring transparent conductive layer TL2_O2. The fourth sensing transparent conductive layer TL2_Rx may be formed in the same process as each of the third sensing transparent conductive layer TL2_Tx, the third pad transparent conductive layer TL2_P1, the fourth pad transparent conductive layer TL2_P2, the third wiring transparent conductive layer TL2_O1, and the fourth wiring transparent conductive layer TL2_O2.

Each of the third sensing transparent conductive layer TL2_Tx and the fourth sensing transparent conductive layer TL2_Rx may be formed of transparent conductive oxide (TCO). The transparent conductive oxide may include for example, at least one of indium tin oxide (ITO), indium zinc oxide (IZO), or indium gallium zinc oxide (IGZO).

The connection unit CN includes a second connection transparent conductive layer TL2_C, a connection metal layer ML1_C, and a first connection transparent conductive layer TL1_C. The second connection transparent conductive layer TL2_C may be formed between the touch substrate SUB and the connection metal layer ML1_C. The second connection transparent conductive layer TL2_C may be formed on the same layer as each of the third sensing transparent conductive layer TL2_Tx, the fourth sensing transparent conductive layer TL2_Rx, the third pad transparent conductive layer TL2_P1, the fourth pad transparent conductive layer TL2_P2, the third wiring transparent conductive layer TL2_O1, and the fourth wiring transparent conductive layer TL2_O2. The second connection transparent conductive layer TL2_C may be formed of the same material as each of the third sensing transparent conductive layer TL2_Tx, the fourth sensing transparent conductive layer TL2_Rx, the third pad transparent conductive layer TL2_P1, the fourth pad transparent conductive layer TL2_P2, the third wiring transparent conductive layer TL2_O1, and the fourth wiring transparent conductive layer TL2_O2. The second connection transparent conductive layer TL2_C may be formed in the same process as each of the third sensing transparent conductive layer TL2_Tx, the fourth sensing transparent conductive layer TL2_Rx, the third pad transparent conductive layer TL2_P1, the fourth pad transparent conductive layer TL2_P1, the third wiring transparent conductive layer TL2_O1, and the fourth wiring transparent conductive layer TL2_O2.

The second connection transparent conductive layer TL2_C may be formed of transparent conductive oxide (TCO). The transparent conductive oxide may include, for example, at least one selected of indium tin oxide (ITO), indium zinc oxide (IZO), or indium gallium zinc oxide (IGZO).

In FIGS. 1 and 4, each of the first sensing electrodes Tx of the touch screen panel 10 includes the third sensing transparent conductive layer TL2_Tx, the first sensing metal layer ML1_Tx, the first sensing transparent conductive layer TL1_Tx, the sensing insulation layer INL1_Tx, and the second sensing metal layer ML2_Tx having the mesh structure. The first sensing electrodes Tx spaced apart from each other in the first direction (for example, the DR1 in FIG. 1) are connected to each other by the bridge BD. Each of the second sensing electrodes Rx includes the fourth sensing transparent conductive layer TL2_Rx, the third sensing metal layer ML1_Rx, and the second sensing transparent conductive layer TL1_Rx. The second sensing electrodes Rx spaced apart from each other in the second direction (for example, the direction DR2 in FIG. 1) are connected to the each other by the connection unit CN.

In another embodiment, each of the first sensing electrodes Tx may include the fourth sensing transparent conductive layer TL2_Rx, the third sensing metal layer ML1_Rx, and the second sensing transparent conductive layer TL1_Rx. The first sensing electrodes Tx spaced apart from each other in the first direction (for example, the first direction in FIG. 1) may be connected to each other by the connection unit CN. Each of the second sensing electrodes Rx may include the third sensing transparent conductive layer TL2_Tx, the first sensing metal layer ML1_Tx, the first sensing transparent conductive layer TL1_Tx, the sensing insulation layer INL1_Tx, and the second sensing metal layer ML2_Tx having the mesh structure. The second sensing electrodes Rx spaced apart from each other in the second direction (for example, the second direction DR2 in FIG. 1) may be connected to each other by the bridge BD.

In one proposed touch screen panel, a pad unit, a peripheral wiring, a sensing electrode, a bridge BD and a connection unit CN are formed in different processes. In accordance with one or more embodiments of the touch screen panel 10, the first pad units PAD1, the first peripheral wirings OL1, the first sensing electrodes Tx, and the bridge BD are formed in the same process. Also, the second pad units PAD2, the second peripheral wirings OL2, the second sensing electrodes Rx, and the connection unit CN are formed in the same process. As a result, the number of mask processes may be reduced, and also costs and tact time (e.g., manufacturing time required per product unit for achieving a daily production target amount) may be reduced.

Figure 5:
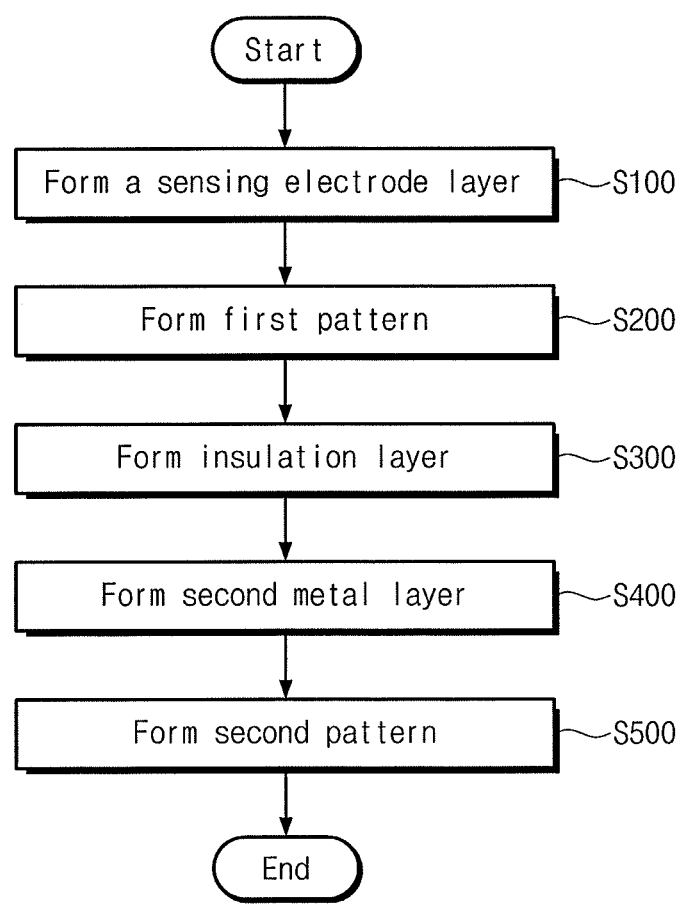
FIG. 5 illustrates a method for fabricating a touch screen panel.
Figure 6A:
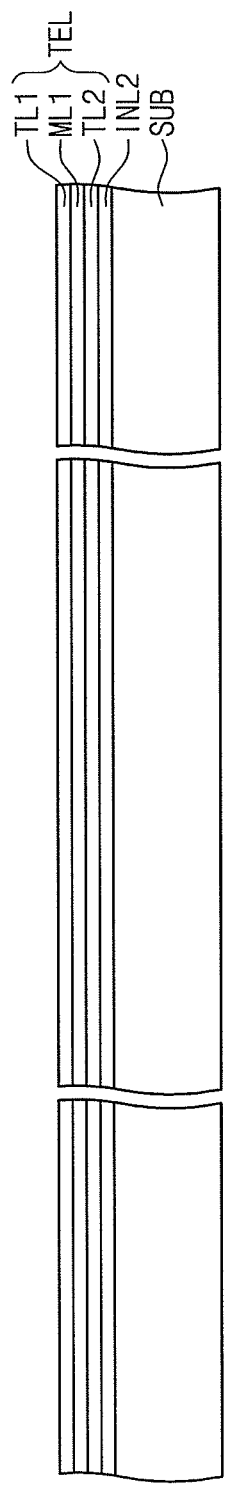
Figure 6B:
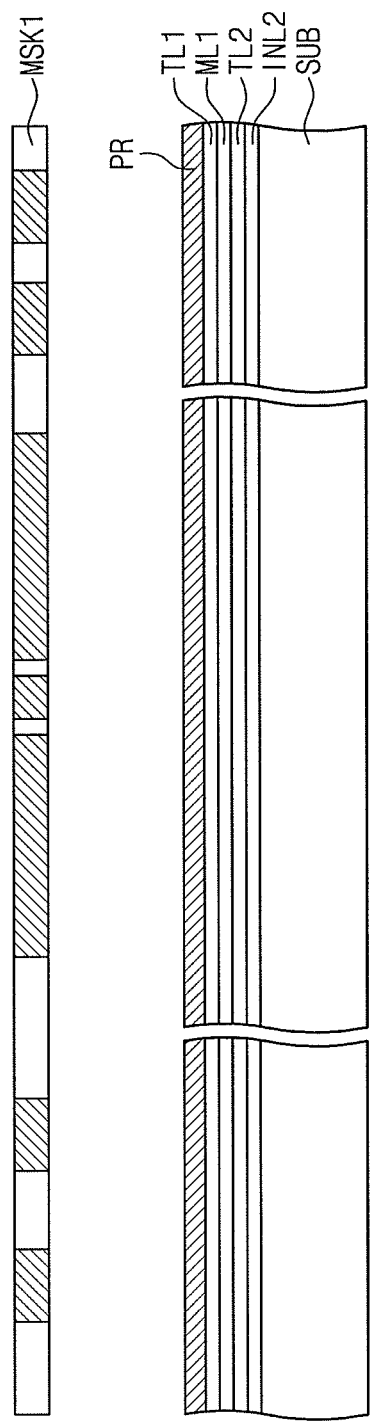
Figure 6C:
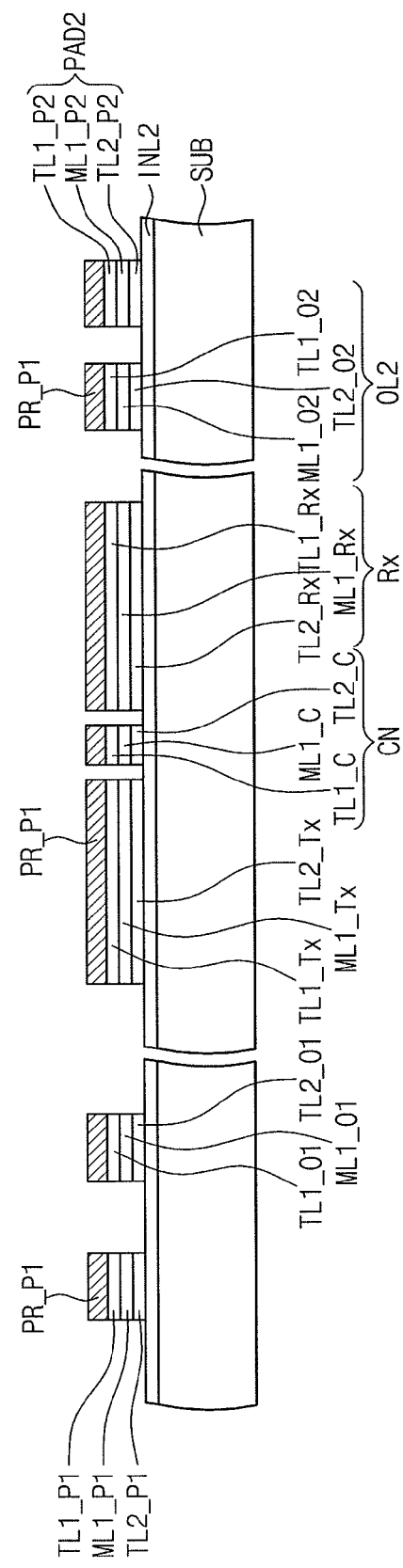
Figure 6D:
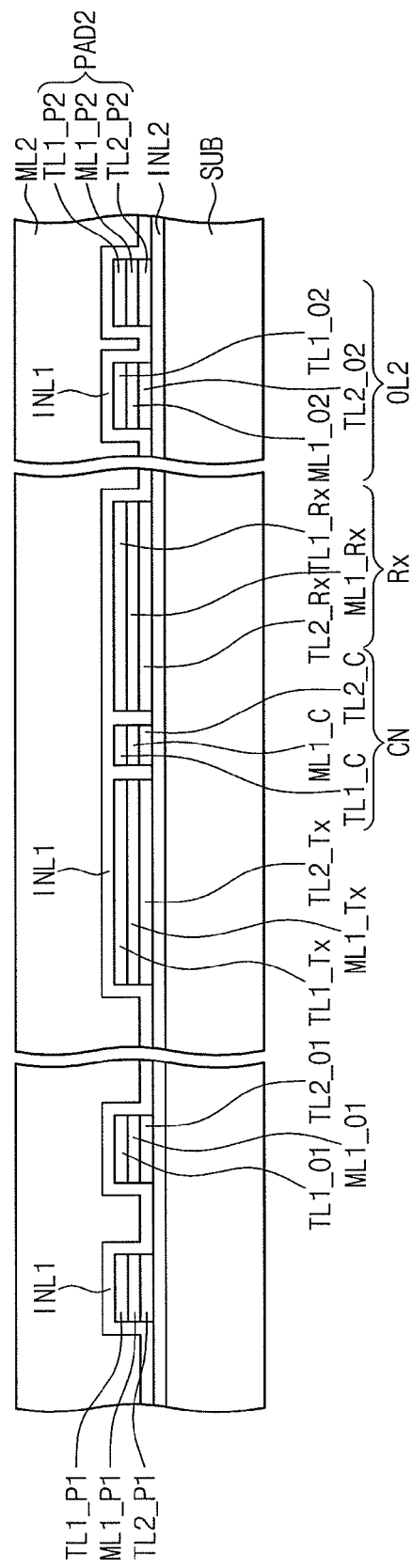
Figure 6E:
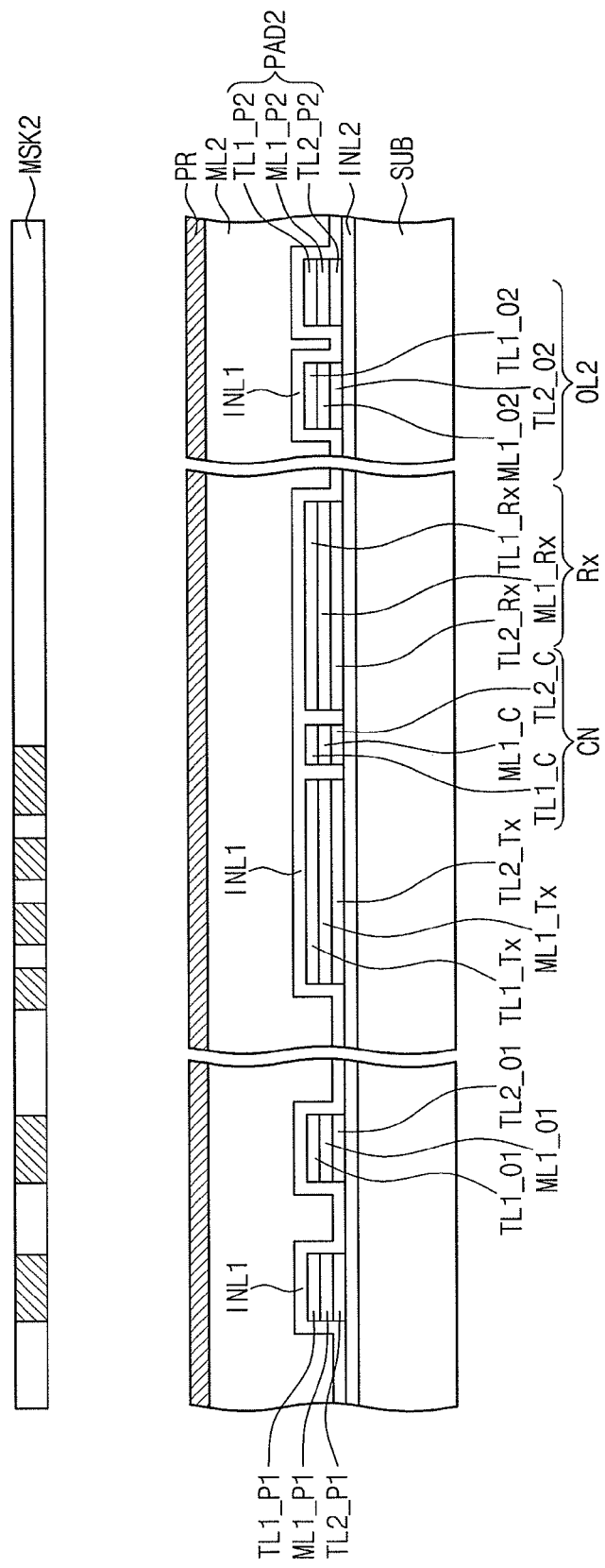
Figure 6F:
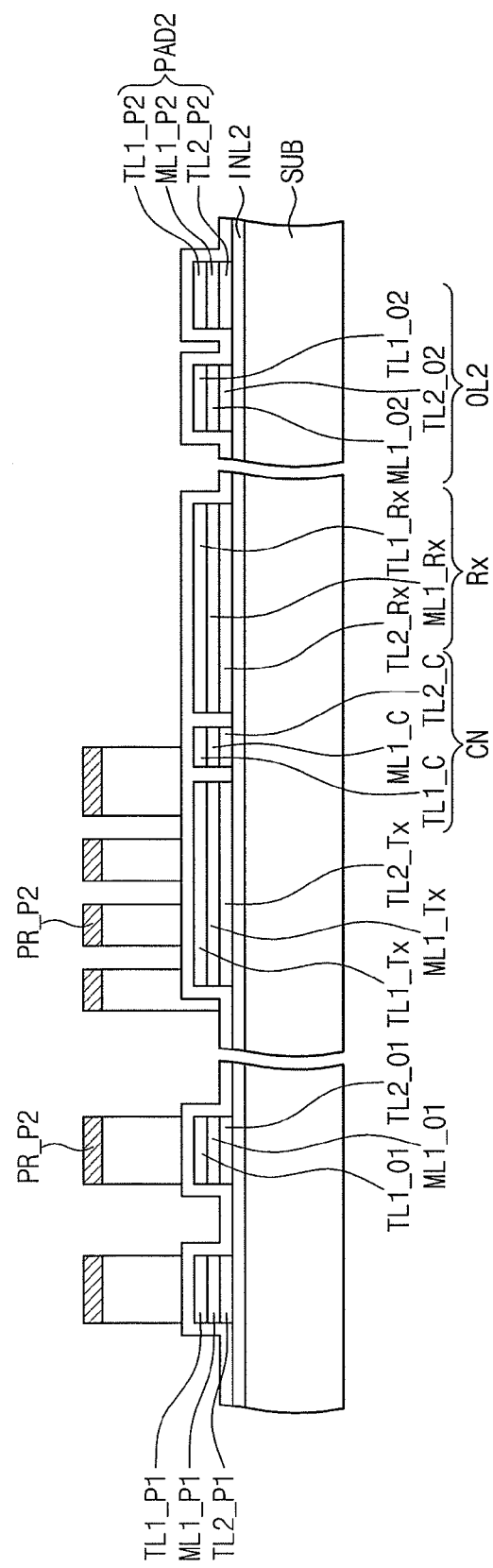

FIG. 5 illustrates an embodiment of a method for fabricating a touch screen panel, which, for example, may be touch screen panel 10. FIG. 6A to 6G illustrate cross-sectional views sequentially illustrating different stages of the touch screen panel produced by operations of the method.

Referring to FIGS. 1, 4, and 5, a method for fabricating a touch screen panel 10 may include forming a sensing electrode layer TEL on a touch substrate (S100), patterning the sensing electrode layer TEL to form a first pattern including second pad units PAD2, second peripheral wirings OL2, second sensing electrodes Rx and connection unit CN (S200), forming an insulation layer INL1 on the touch substrate SUB on which the first pattern is formed (S300), forming a second metal layer ML2 on the insulation layer INL1, and patterning the second metal layer ML2 and the insulation layer INL1 to form a second pattern including first pad units PAD1, first peripheral wirings OL1, first sensing electrodes Tx and a bridge BD (S500). The second metal layer ML2 may be thicker than the first metal layer ML1.

Referring to FIGS. 1, 4, 5, and 6A, a sensing electrode layer TEL is formed on a touch substrate SUB (S100). Forming the sensing electrode layer TEL (S100) may include forming a second transparent conductive layer TL2 on the touch substrate SUB, forming a first metal layer ML1 on the second transparent conductive layer TL2, and forming a first transparent conductive layer TL1 on the first metal layer ML1.

The method has been described for fabricating the touch screen panel 10 of FIG. 4. In another embodiment, except for forming the sensing electrode layer TEL (S100) by forming the first metal layer ML1 on the touch substrate SUB and forming the first transparent conductive layer TL1 on the first metal layer ML1, the method may be used to fabricate the touch screen panel 10 in FIG. 3. In another embodiment, except for forming the sensing electrode layer TEL (S100) by forming the first metal layer ML1, the method may be used to fabricate the touch screen panel 10 of FIG. 2.

The touch substrate SUB may be a transparent touch substrate SUB formed, for example, of a transparent dielectric film. The touch substrate SUB may include, for example, plastic, glass, ceramic, or a polymer. Each of the first transparent conductive layer TL1 and the second transparent conductive layer TL2 may include, for example, at least one of indium tin oxide (ITO), indium zinc oxide (IZO), or indium gallium zinc oxide (IGZO). The first metal layer ML1 may include, for example, at least one of Cu, Ti, Al, Ag, Au, Pt, Mo, a silver-palladium-copper alloy (APC), or a silver-palladium alloy (AP).

The patterning the first pattern (S200) may include forming a photoresist layer PR on the sensing electrode layer TEL, exposing the photoresist layer to light through a first mask, and developing the photoresist layer PR to form a first photoresist pattern PR_P1. Also, patterning the first pattern may include etching the sensing electrode layer TEL using the first photoresist pattern PR_P1 as a mask to form the first pattern including the second pad units PAD2, the second peripheral wirings OL2, the second sensing electrodes Rx, and the connection unit CN.

In one embodiment, the method may also include annealing the second transparent conductive layer TL2.

Referring to FIGS. 1, 4, 5, and 6B, a photoresist layer PR is formed on the sensing electrode layer TEL. The photoresist layer PR may be formed applying photoresist. A first mask MSK1 is disposed over the photoresist layer PR.

Referring to FIGS. 1, 4, 5, and 6C, the photoresist layer is exposed to light through a first mask MSK1 and then developed to form a first photoresist pattern PR_P1. The first photoresist pattern PR_P1 overlaps the first pad transparent conductive layer TL1_P1, the second pad transparent conductive layer TL1_P2, the first wiring transparent conductive layer TL1_O1, the second wiring transparent conductive layer TL1_O2, the first sensing transparent conductive layer TL1_Tx, the second sensing transparent conductive layer TL1_Rx, and the first connection transparent conductive layer TL1_C. The sensing electrode layer TEL is etched using the photoresist pattern PR_P1 as a mask to form a first pattern. The first pattern includes the second pad units PAD2, the second peripheral wirings OL2, the second sensing electrodes Rx, and the connection unit CN.

Referring to FIGS. 1, 4, 5, and 6D, the first photoresist pattern PR_P1 is removed. An insulation layer INL1 is formed on the touch substrate SUB on which the first pattern is formed (S300). The insulation layer INL1 may include, for example, silicon oxide or silicon nitride.

A second metal layer ML2 is formed on the insulation layer INL1 (S400). The second metal layer ML2 may include, for example, at least one of Cu, Ti, Al, Ag, Au, Pt, Mo, a silver-palladium-copper alloy (APC), or a silver-palladium alloy (AP). The second metal layer ML2 may be thicker than the first metal layer ML1.

One type of touch screen panel having a sensing electrode formed of a transparent conductive layer has limitations in that a recognition speed is low due to an RC delay. Also, a crack is formed from bending the sensing electrode. Also, other panels including a sensing electrode formed of a metal layer having a mesh shape and a transparent conductive layer have limitations. For example, a pattern is easily visible to the human eye due to high reflectivity of the metal layer. Also, glaring occurs due to high reflectivity of light from an external source and a haze value exists.

In accordance with one or more embodiments, a method for fabricating a touch screen panel includes forming the second metal layer that is thicker than the first metal layer. Each of the first sensing electrodes Tx of the touch screen panel 10 fabricated by the method may include the second sensing metal layer ML2_Tx having the thickness (t2 of FIG. 2) greater than that (t1 of FIG. 2) of the first sensing metal layer ML1_Tx to reduce resistance of the first sensing electrodes Tx. As a result, response speed of the touch screen panel is improved.

Also, reflection by the first sensing transparent conductive layer TL1_Tx may be reduced or prevented and absorbance may be improved, thereby improving invisibleness of the first sensing transparent conductive layer TL1_Tx. Therefore, the contrast characteristic of the touch screen panel 10 fabricated by one or more embodiments of the method may be improved.

Forming the second pattern may include forming a photoresist layer PR on the second metal layer ML2, exposing the photoresist layer PR to light through a second mask and developing the photoresist layer PR to form a second photoresist pattern PR_P2, etching the second metal layer ML2 by using the second photoresist pattern as a mask, and etching the insulation layer INL1 by using the second photoresist pattern PR_P2 as a mask to form a second pattern including the first sensing electrodes Tx, the bridge BD, the first pad parts PAD1, and the first peripheral wirings OL1.

Referring to FIGS. 1, 4, 5, and 6E, a photoresist layer PR is formed on the second metal layer ML2. The photoresist layer PR may be formed by applying photoresist. A second mask MSK1 is disposed over the photoresist layer PR.

Referring to FIGS. 1, 4, 5, and 6F, the photoresist layer is exposed to light through the second mask MSK2 and then developed to form a second photoresist pattern PR_P2. The second photoresist pattern PR_P2 overlaps the second pad metal layer ML2_P1, the second wiring metal layer ML2_O1, the second sensing metal layer ML2_Tx, and the bridge metal layer ML2_B. The second metal layer ML2 is etched by using the second photoresist pattern PR_P2 as a mask.

Referring to FIGS. 1, 4, 5, and 6G, the insulation layer INL1 is etched using the etched second metal layer ML1 as a mask to form a second pattern (S500). The second pattern includes the first sensing electrodes Tx, the bridge BD, the first pad units PAD1, and the first peripheral wirings OL1.

In one type of touch screen panel, a pad unit, a peripheral wiring, a sensing electrode, a bridge, and a connection unit are formed in different processes. In accordance with one or more embodiments of the touch screen panel, the first pad units PAD1, the first peripheral wirings OL1, the first sensing electrodes Tx, and the bridge are formed in the same process. Also, the second pad units PAD2, the second peripheral wirings OL2, the second sensing electrodes Rx, and the connection unit are formed in the same process. As a result, the number of mask processes may be reduced. Also, costs and tact time (e.g., manufacturing time required per product unit for achieving a daily production target amount) may be reduced.

By way of summation and review, in one type of touch screen panel which has been proposed, a pad unit, peripheral wiring, sensing electrode, bridge, and a connection unit are formed by different processes. In accordance with one or more of the aforementioned embodiments, first pad units, first peripheral wirings, first sensing electrodes, and a bridge of a touch screen panel are formed in a same process. Also, second pad units, second peripheral wirings, second sensing electrodes, and a connection unit are formed by a same process. As a result, the number of mask processes used during fabrication may be reduced, along with costs and tact time. Also, a touch screen panel is fabricated with improved reliability.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A touch screen panel, comprising:
   a touch substrate;
   a sensing electrode area including first sensing electrodes and second sensing electrodes on the touch substrate and spaced apart from each other in a first direction and a second direction intersecting the first direction;
   a pad area electrically connected to the sensing electrode area; and
   a peripheral wiring area connecting the sensing electrode area and the pad area, wherein each of the first sensing electrodes includes a first sensing metal layer on the touch substrate, a sensing insulation layer on the first sensing metal layer, and a second sensing metal layer on the sensing insulation layer and having a mesh structure, and wherein the second sensing metal layer is thicker than the first sensing metal layer, the second sensing metal layer being directly above the sensing insulation layer and the first sensing metal layer.

2. The panel as claimed in claim 1, wherein each of the second sensing electrodes includes a third sensing metal layer on a same layer as the sensing metal layer.

3. The panel as claimed in claim 2, further comprising:
a connector connecting the second sensing electrodes spaced apart from each other in the second direction, wherein the connector includes a connection metal layer on a same layer as each of the first sensing electrode layer and the third sensing metal layer.

4. The panel as claimed in claim 3, further comprising:
a bridge connecting the first sensing electrodes spaced apart from each other in the first direction, wherein the bridge includes:
a bridge insulation layer having a portion on the connector; and
a bridge metal layer on the bridge insulation layer and on a same layer as the second sensing metal layer.

5. The panel as claimed in claim 4, wherein the bridge metal layer is thicker than the connection metal layer.

6. The panel as claimed in claim 2, wherein the pad area includes:
first pads electrically connected to the first sensing electrodes; and
second pads electrically connected to the second sensing electrodes,
wherein each of first pads includes a first pad metal layer on a same layer as the first sensing metal layer, a pad insulation layer on the pad metal layer and on a same layer as the sensing insulation layer, and a second pad metal layer on the pad insulation layer and on a same layer as the second sensing metal layer, and
wherein each of the second pads includes a third pad metal layer on a same layer as each of the first sensing metal layer, the third sensing metal layer, and the first pad metal layer.

7. The panel as claimed in claim 6, wherein the second pad metal layer is thicker than the first pad metal layer.

8. The panel as claimed in claim 6, wherein the peripheral wiring area includes:
first peripheral wirings connecting the first sensing electrodes and the first pads respectively; and
second peripheral wirings connecting the second sensing electrodes and the second pad respectively,
wherein each of the first peripheral wirings includes a first wiring metal layer on a same layer as the first sensing metal layer, a wiring insulation layer on the first wiring metal later and on a same layer as the sensing insulation layer, and a second wiring metal layer on the wiring insulation layer and on a same layer as the second sensing metal layer, and
wherein each of the second peripheral wirings includes a third wiring metal layer on a same layer as each of the first sensing metal layer, the third sensing metal layer, and the first wiring metal layer.

9. The panel as claimed in claim 8, wherein the second wiring metal layer is thicker than the first wiring metal layer.

10. The panel as claimed in claim 2, wherein:
each of the first sensing electrodes includes a first sensing transparent conductive layer between the first sensing metal layer and the sensing insulation layer, and
each of the second sensing electrodes includes a second sensing transparent conductive layer on the third sensing metal layer and on a same layer as the first sensing transparent conductive layer.

11. The panel as claimed in claim 10, wherein:
each of the first sensing electrodes includes a third sensing transparent conductive layer between the touch substrate and the first sensing metal layer, and
each of the second sensing electrodes includes a fourth sensing transparent conductive layer between the touch substrate and the third sensing metal layer and on a same layer as the third sensing transparent conductive layer.

12. The panel as claimed in claim 10, wherein each of the first sensing transparent conductive layer and the second sensing transparent conductive layer includes at least one of indium tin oxide (ITO), indium zinc oxide (IZO), or indium gallium zinc oxide (IGZO).

13. The panel as claimed in claim 1, wherein each of the first metal layer and the second sensing metal layer includes at least one of Cu, Ti, Al, Ag, Au, Pt, Mo, a silver-palladium-copper alloy (APC), or a silver-palladium alloy (AP).

14. The panel as claimed in claim 1, further comprising:
a substrate insulation layer on the touch substrate,
wherein each of the sensing electrode area, pad area, and peripheral wiring area is on the substrate insulation layer.

15. A method for fabricating a touch screen panel, the method comprising:
forming a sensing electrode layer on a touch substrate, the sensing electrode layer including a first metal layer;
patterning the sensing electrode layer to form a first pattern, the first pattern including pads, second peripheral wirings, second sensing electrodes, and a connector;
forming an insulation layer on the touch substrate;
forming a second metal layer on the insulation layer; and
patterning the second metal layer and the insulation layer to form first peripheral wirings, first sensing electrodes, and a bridge, wherein the second metal layer is thicker than the first metal layer, and the second sensing metal layer is directly above the sensing insulation layer and the first sensing metal layer.

16. The method as claimed in claim 15, wherein forming the first pattern includes:
forming a photoresist layer on the sensing electrode layer;
exposing the photoresist layer to light through a first mask and developing the photoresist layer to form a first photoresist pattern; and
etching the sensing electrode layer using the first photoresist pattern as a mask to form the first pattern including the pads, the second peripheral wirings, the second sensing electrodes, and the connector.

17. The method as claimed in claim 15, wherein forming the second pattern includes:
forming a photoresist layer on the second metal layer;
exposing the photoresist layer to light through a second mask and developing the photoresist layer to form a second photoresist pattern;
etching the second metal layer using the photoresist pattern as a mask;
etching the insulation layer using the etched second metal layer as a mask to form the second pattern including additional pads, the first peripheral wirings, the first sensing electrodes, and the bridge.

18. The method as claimed in claim 15, wherein forming the sensing electrode includes forming a first transparent conductive layer on the first metal layer.

19. The method as claimed in claim 18, wherein forming the sensing electrode layer includes forming a second transparent conductive layer between the touch substrate and the first metal layer.

20. A touch screen panel, comprising:
a pad area;
a sensing electrode area including first sensing electrodes and second sensing electrodes; and
a wiring area connecting the sensing electrode area and the pad area,
wherein each of the first sensing electrodes includes a first sensing metal layer, a sensing insulation layer on the first sensing metal layer, and a second sensing metal layer on the sensing insulation layer, the second sensing metal layer being thicker than the first sensing metal layer, and the second sensing metal layer being directly above the sensing insulation layer and the first sensing metal layer.

* * * * *